United States Patent
Chu et al.

(10) Patent No.: US 11,935,021 B2
(45) Date of Patent: *Mar. 19, 2024

(54) SYSTEMS AND METHODS FOR BOT-BASED AUTOMATED INVOICING AND COLLECTION

(71) Applicant: JPMORGAN CHASE BANK, N.A., New York, NY (US)

(72) Inventors: Victor Chu, Hastings, NY (US); Batu Sayici, Brooklyn, NY (US); Justin Marks, Woodside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,997

(22) Filed: Nov. 22, 2022

(65) Prior Publication Data

US 2023/0169480 A1 Jun. 1, 2023

Related U.S. Application Data

(63) Continuation of application No. 16/554,679, filed on Aug. 29, 2019, now Pat. No. 11,544,686.

(Continued)

(51) Int. Cl.
*G06Q 30/00* (2023.01)
*G06Q 20/14* (2012.01)
(Continued)

(52) U.S. Cl.
CPC ......... *G06Q 20/14* (2013.01); *G06Q 30/0222* (2013.01); *G06Q 30/0617* (2013.01); *G06Q 30/0631* (2013.01); *G06Q 30/0633* (2013.01)

(58) Field of Classification Search
CPC .............. G06Q 20/14; G06Q 30/0222; G06Q 30/0617; G06Q 30/0631; G06Q 30/0633; G06Q 20/102
See application file for complete search history.

(56) References Cited

U.S. PATENT DOCUMENTS 9,443,268 B1 * 9/2016 Kapczynski ........... G06Q 20/24
9,807,037 B1 * 10/2017 Sapoznik ................ G06F 40/35
(Continued)

OTHER PUBLICATIONS

S. M. Rodrigo and J. G. F. Abraham, "Development and Implementation of a Chat Bot in a Social Network," 2012 Ninth International Conference on Information Technology—New Generations, Las Vegas, NV, USA, 2012, pp. 751-755, doi: 10.1109/ITNG.2012.147. (Year: 2012).*

(Continued)

*Primary Examiner* — Sun M Li
(74) *Attorney, Agent, or Firm* — GREENBERG TRAURIG LLP

(57) ABSTRACT

In one embodiment, in an information processing apparatus, comprising at least one computer processor, a Bot executed by the at least one computer processor may perform the following: (1) receiving invoice information for an invoice for a payor, the invoice information comprising an invoice amount and a due date; (2) electronically communicating a payment reminder comprising the invoice amount and the due date to the payor in a chat interface; and (3) providing a payment interface in the chat interface.

20 Claims, 4 Drawing Sheets

Related U.S. Application Data

(60) Provisional application No. 62/731,139, filed on Sep. 14, 2018.

(51) Int. Cl.
    *G06Q 30/0207*    (2023.01)
    *G06Q 30/0601*    (2023.01)

(56) References Cited

U.S. PATENT DOCUMENTS

| | | | |
|---|---|---|---|
| 10,423,948 | B1 | 9/2019 | Wilson et al. |
| 11,107,141 | B1* | 8/2021 | Nagarajappa ...... G06Q 30/0617 |
| 2011/0161149 | A1 | 6/2011 | Kaplan |
| 2012/0266258 | A1 | 10/2012 | Tuchman et al. |
| 2014/0019217 | A1* | 1/2014 | Eliscu .................. G06Q 30/06 705/14.1 |
| 2017/0012907 | A1* | 1/2017 | Smullen ................ H04L 51/046 |
| 2018/0103004 | A1 | 4/2018 | Demir et al. |
| 2018/0232814 | A1* | 8/2018 | Dey .................... G06Q 10/067 |
| 2018/0367483 | A1* | 12/2018 | Rodriguez ............ H04L 51/046 |
| 2019/0102813 | A1* | 4/2019 | O'Neill ................ H04L 51/52 |
| 2020/0380481 | A1* | 12/2020 | Kalaboukis .......... G06Q 20/102 |

OTHER PUBLICATIONS

J. Gao, K. Edunuru, J. Cai and S. P. D. Shim, "P2P-Paid: A Peer-to-Peer Wireless Payment System," Second IEEE International Workshop on Mobile Commerce and Services, Munich, Germany, 2005, pp. 102-111, doi: 10.1109/WMCS.2005.16. (Year: 2005).*

G. Lawton, "Instant messaging puts on a business suit," in Computer, vol. 36, No. 3, pp. 14-16, Mar. 2003, doi: 10.1109/MC.2003.1185208. (Year: 2003).*

C. Pricilla, D. P. Lestari and D. Dharma, "Designing Interaction for Chatbot-Based Conversational Commerce with User-Centered Design," 2018 5th International Conference on Advanced Informatics: Concept Theory and Applications (ICAICTA), 2018, pp. 244-249, doi: 10.1109/ICAICTA.2018.8541320. (Year: 2018).*

D. R. Vukovic and I. M. Dujlovic, "Facebook messenger bots and their application for business," 2016 24th Telecommunications Forum (TELFOR), 2016, pp. 1-4, doi: 10.1109/TELFOR.2016.7818926. (Year: 2016) (Year: 2016).*

G. Lawton, "Instant messaging puts on a business suit," in Computer, vol. 36, No. 3, pp. 14-16, Mar. 2003, doi: 10.1109/MC.2003.1185208.

A. Kraft, S. Pitsch and M. Vetter, "Agent-driven online business in virtual communities," Proceedings of the 33rd Annual Hawaii International Conference on System Sciences, 2000, pp. 10 pp. vol.2-, doi: 10.1109/HICSS.2000.926995.

D. R. Vukovic and I. M. Dujlovic, "Facebook messenger bots and their application for business," 2016 24th Telecommunications Forum (TELFOR), 2016, pp. 1-4, doi: 10.1109/TELFOR.2016.7818926.

* cited by examiner

SYSTEMS AND METHODS FOR BOT-BASED AUTOMATED INVOICING AND COLLECTION

RELATED APPLICATIONS

This application is a continuation of U.S. patent application Ser. No. 16/554,679, now U.S. Pat. No. 11,544,686, filed Aug. 29, 2019, which claims the benefit of U.S. Provisional Patent Application Ser. No. 62/731,139, filed Sep. 14, 2018, the disclosure of which is hereby incorporated by reference in its entirety.

BACKGROUND OF THE INVENTION

1. Field of the Invention

Embodiments are directed to systems and methods for bot-based automated invoicing and collection.

2. Description of the Related Art

Many businesses may have thousands of invoices due per month. Manually collecting and negotiating each invoice is expensive in time, labor and cost. This may result in invoices not being paid, resulting in a loss of revenue.

SUMMARY OF THE INVENTION

Systems and methods for bot-based automated invoicing and collection are disclosed. In one embodiment, in an information processing apparatus, comprising at least one computer processor, a Bot executed by the at least one computer processor may perform the following: (1) receiving invoice information for an invoice for a payor, the invoice information comprising an invoice amount and a due date; (2) electronically communicating a payment reminder comprising the invoice amount and the due date to the payor in a chat interface; and (3) providing a payment interface in the chat interface.

In one embodiment, the invoice may be overdue or coining due.

In one embodiment, the method may further include automatically identifying a payment incentive; and communicating the payment incentive to the payor in the chat interface. The payment incentive may be a discount on the invoice amount, a discount on a future invoice amount, etc. The payment incentive may be identified based on a past interaction with the payor.

In one embodiment, the method may further include electronically communicating a link to a payment modality to the payor.

In one embodiment, the method may further include automatically negotiating with the payor using natural language processing.

In one embodiment, the method may further include updating a payor record with a result of the electronic communication.

According to another embodiment, in an information processing apparatus, comprising at least one computer processor, a Bot executed by the at least one computer processor may perform the following: (1) monitoring a real-time communication between a buyer and a seller; (2) upon activation to take an order, electronically prompting the buyer or the seller for order details for an order being placed by a buyer, wherein the order details comprise an identification of a good or service, a quantity, a price, and a payment method; (3) receiving the order details; and (4) communicating the order details to a backend system for fulfillment.

In one embodiment, the communication may be an electronic text communication, a voice communication, a voice communication is over an electronic device, a video conference, an Internet-based meeting, etc.

In one embodiment, the Bot may be automatically activated to receive the order details based on a context of the communication, may be manually activated to receive the order details, etc.

In one embodiment, the method may further include automatically identifying an upsell; and presenting the upsell to the buyer. The upsell may be based on a buyer interest, a successful upsell with a prior buyer of the good or service, etc.

In one embodiment, the Bot may be executed by a portable electronic device.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for bot based automated invoicing and collection.

In embodiments, a computer program (e.g., a Bot) may be used to negotiate and collect invoices from one or more (e.g., thousands) of vendors at substantially simultaneously. The Bot may identify an invoice that is coining due, send a reminder to the payor, present a payment mechanism to facilitate the payment, provide alternate payment mechanisms (e.g., pay some now, pay some later, etc.), provide payment incentives (e.g., provide a discount for prompt payment), etc.

In one embodiment, the Bot may collect and aggregate analytics on payors, such as average time for payment, etc. Embodiments may incorporate the analytics into an organization's cash flow management system, and may provide information on when a payment is likely to be received based on the payor's payment history.

In embodiments, machine learning and/or artificial intelligence may be used to provide analysis on the analytics.

Embodiments may automate invoicing by receiving an image of a paper invoice and populating data fields in a collection system with information from the invoice.

Embodiments may further prioritize invoices when there are multiple invoices due. For example, the Bot may prioritize invoices based on due date, amount, or any other criteria as is necessary and/or desired.

Figure 1:
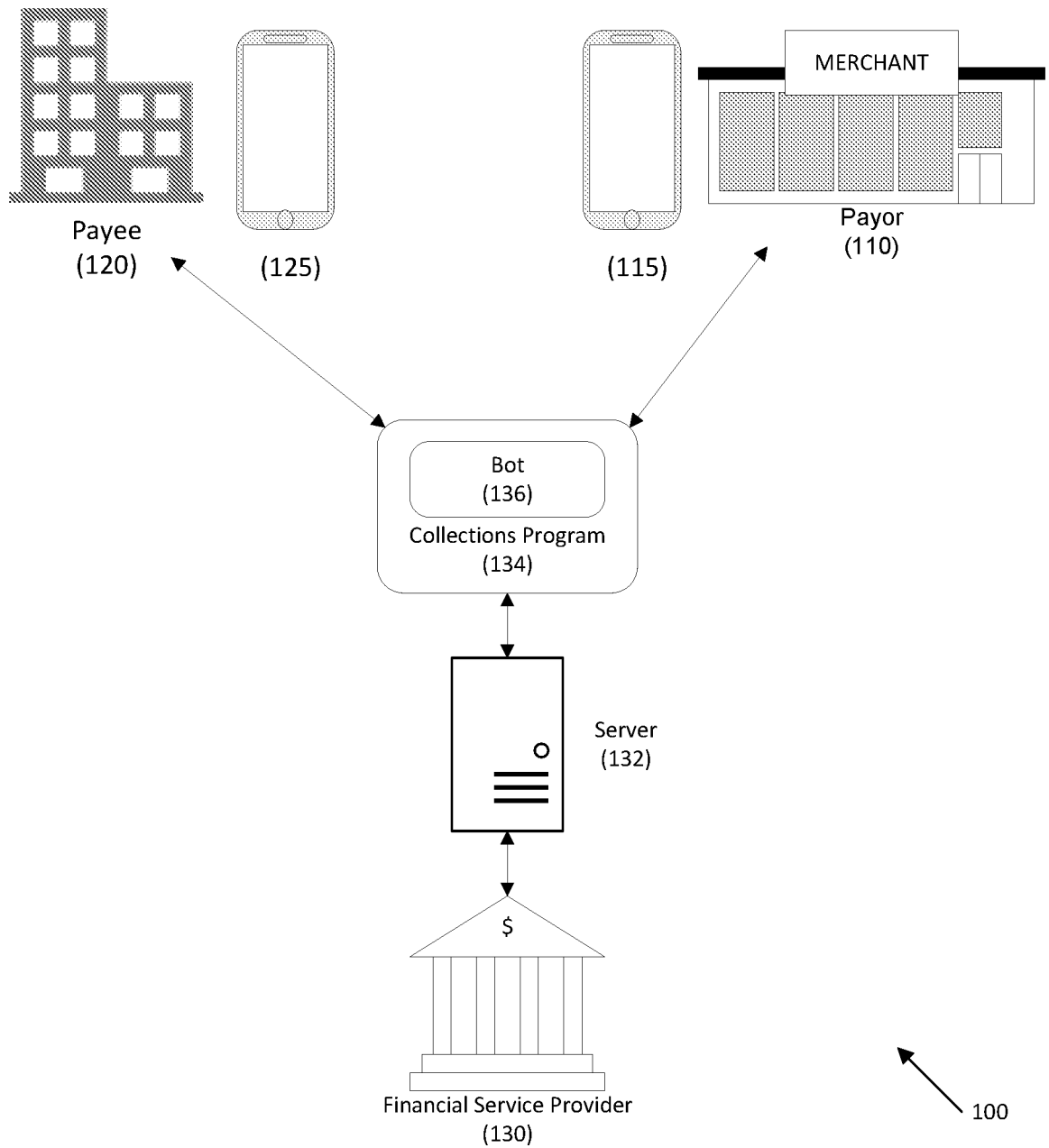
FIG. 1 depicts a system for bot-based automated invoicing and collection according to one embodiment.

Referring to FIG. 1, a system for Bot-based automated invoicing and collection is disclosed according to one embodiment. System 100 may include payor 110, payee 120, and financial service provider 130. Payor 110 may receive a good or service from payee 120. Payor 110 and payee 120 may be any suitable entities, including individuals, groups of individuals, companies, organizations, etc. For example, payor 110 may be a buyer, and payee 120 may be a seller.

Payor 110 and payee 120 may each be associated with electronic devices 115, 125, respectively. Electronic devices 115 and 125 may be any suitable electronic devices, including computers (e.g., desktop, notebook, tablet, etc.), smartphones, smart watches, Internet of Things (IoT) appliances, etc.

Financial service provider 130 may be a financial institution or FinTech used by payee 120 that provides invoicing, terms, negotiations, billing, payment, order financing, order factoring, collection services, etc. Financial service provider 130 may host server 132 that executes collections program 134. Server 132 may be based with the financial institution 130, or it may be a cloud-based server.

Collections program 134 may be a computer-based program that may manage invoices for payee 110. In one embodiment, payor 110 and payee 120 may communicate with collections program 134 using mobile devices 115 and 125, respectively.

Collections program 134 may execute bot 136 that may communicate with payor 110 in order to resolve an outstanding invoice. In one embodiment, bot 134 may further communicate with payee 120 to, for example, request invoice information, provide updates, etc.

Figure 2:
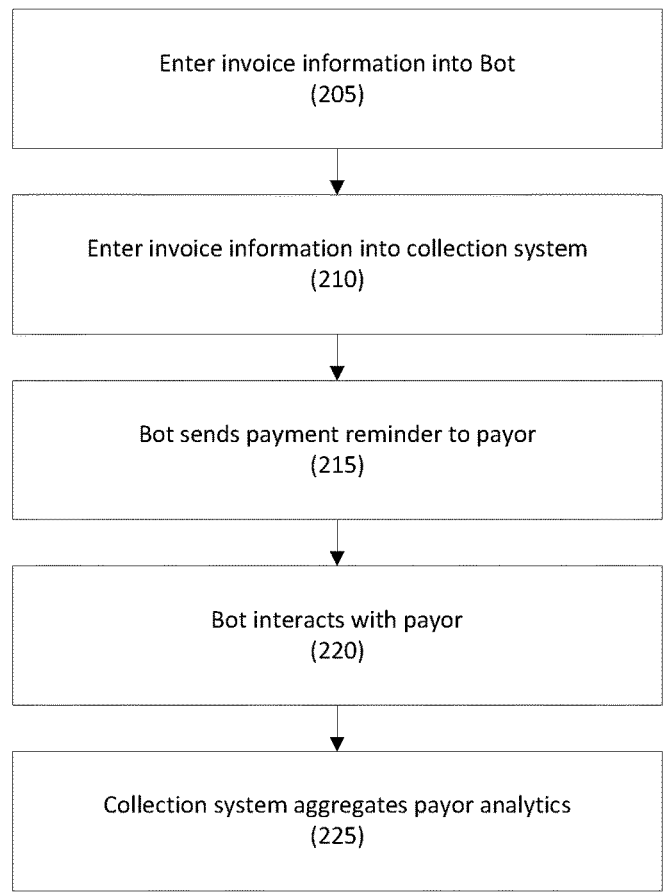
FIG. 2 depicts a method for bot-based automated invoicing and collection according to one embodiment.

Referring to FIG. 2, a method for bot-based automated invoicing and collection is disclosed according to one embodiment.

In step 205, a payee may enter an invoice into a collection program executed by one or more servers, computers, Internet of Things (IoT) appliances, etc. In one embodiment, the invoice may be manually entered, may be provided by an invoicing system, may be received as an image (e.g., a photograph), etc. In another embodiment, a Bot executed by the collections program may receive a purchase order for a purchase.

In embodiments, the invoice data may be received through, for example, voice order, chat order, text message, email message, social media profile, social media message or from a buy modal or button, in which, for example, the Bot may take the order, fulfill it and send an invoice for payment. At least some of the invoice data may be received from a payment method such as Apple Pay, Samsung Pay, credit card, debit card, banking account info, checking/ACH info, a photo or scan of a check to OCR the billing, account, and routing number, etc.

In embodiments, combinations of one or more of these methods/mechanisms, and may "piece" together the order information, who the order is from, identity, address, contact info, billing info, shipping info, and payment means. Based upon this information, the Bot may create an electronic invoice with terms of delivery and payment as well as a payment method, date and invoice identification/tracking/reference number, etc.

In step 210, if not already in a collections system, the Bot may enter the invoice into a collection system. This may permit the collections system or engine to update or change an invoice based upon, for example, Bot negotiations with the payor. For example, if a payor decides to cancel all or a portion of the order, or return goods, then the invoice may be updated.

In step 215, the Bot may send a payment request or reminder with one or more payment options and incentives to the payor. In one embodiment, the Bot may send this to the payor with the initial invoice, as a payment due date approaches, etc.

In one embodiment, the Bot may consider the payor's payment terms in timing the reminder. For example, if the payor is on a 60-day payment term, the Bot may base the reminder on that payment term.

In one embodiment, the Bot may provide payment options to the payor, such as payment amounts, payment modalities, etc. For example, the Bot may provide links to ACH payments, credit card payments, and other payment modalities to the payor.

In one embodiment, the Bot may provide payment options in order to split the invoice into more than one payment. For example, if the payor splits the invoice into multiple payments, the Bot may apply a fee.

In one embodiment, the Bot may provide an incentive for timely or early payment, such as a discount on the current invoice, a discount on a future invoice, etc.

In one embodiment, the Bot may send addition reminders as the payment due date approaches, automatically apply late fees, etc. as is necessary and/or desired.

Figure 3C:
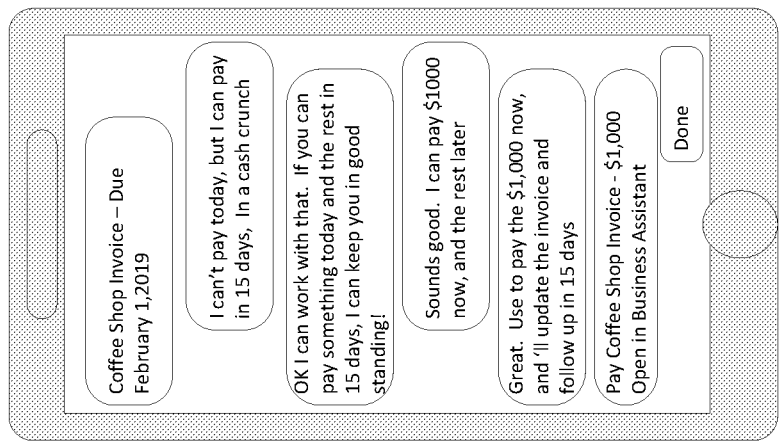
FIGS. 3A-3C depict exemplary screenshots according to embodiments.
Figure 3B:
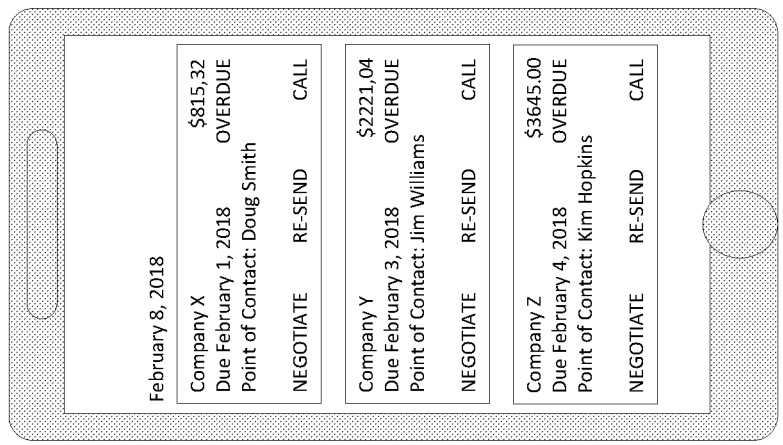
Figure 3A:
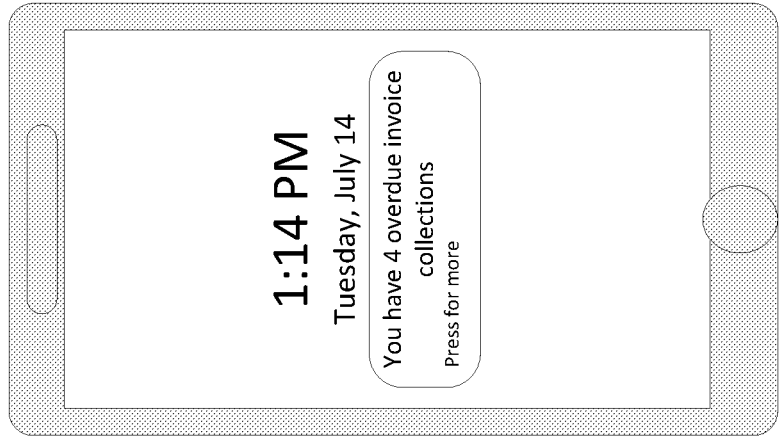

In one embodiment, the Bot may provide the payee with payment notification, such as paid payments, overdue payments, etc. An example of such a notice indicting that there are overdue payments is provided in FIG. 3A.

In one embodiment, the Bot may prioritize outstanding invoices for the payee, and may recommend one or more action to take with the payor. For example, referring to FIG. 3B, the Bot may identify the invoice, the point of contact, the amount due, the status, etc. and may provide options, such as negotiate, re-send invoice, call, etc.

Referring again to FIG. 2, in step 220, the Bot may interact with a payor. In one embodiment, the Bot may interact in a message or chat-type interface in which it may use artificial intelligence, natural language processing, etc. to interact with the payor. An example of such an interface and interaction is provided in FIG. 3C.

In one embodiment, the tone and/or aggressiveness of the Bot's chat may be based on the amount of the invoice, how long the invoice is overdue, prior success/failure of collection efforts (including using the Bot), etc.

In one embodiment, machine learning may be used to predict the amount of an incentive that is likely to result in the payor paying the invoice. The Bot may then set the negotiation strategy to get to this point, such as by starting with a lower incentive than the predicted incentive.

In step 225, the Bot may update information for the payor based on the interaction. For example, if the Bot was successful, the Bot may update the payor's account to reference a successful interaction, may apply any discounts or reductions to the invoice, etc. It may further store a record of the interaction.

The Bot may further inform the payee of the outcome of the interaction.

If the Bot was unsuccessful, the Bot may update the payor's account to reference the results of the interaction, including a record of the communication, what was offered, the response, etc.

The Bot may further inform the payee of the outcome of the interaction.

In one embodiment, the Bot may escalate the invoice as necessary (e.g., provide to a collections agency, etc.).

Referring again to FIG. 2, in step 225, the collection system and/or the Bot (or a combination of Bots) may aggregate data for one or more payor, such as the timing of payment, the amount of payment, number of reminders, and any other data as is necessary and/or desired. The data may be used to predict each payor's payment timing, such as the timing of an expected payment. In one embodiment, the data may be used to grade, rank, and/or recommend payors. For example, a payor that always pays on time may be given an "A" or similar grade, and may be ranked highly in field. Conversely, a payor that does not pay on time may be given a lower ranking.

In embodiments, rankings and insights on payment performance may be used as leverage and incentive by the Bots during collections. Rankings may prevent other businesses from doing business with the poorly-ranked payor. Conversely, a highly ranked payor with a record of paying in full on time may use this info, insights and ranking to negotiate better terms with payees.

In embodiments, a user dashboard or other interface may be used to set and adjust preferences or settings for collecting and negotiating invoices and payments. For example, the settings may be set to aggressive in frequency and in tone, may be set to friendly in frequency and tone, etc. In embodiments, the settings may be set or adjusted based on analytics, insights and grading, creditworthiness intelligence collected by the system through previous collections and negotiations or though external credit rating, business rating and social rating systems, as well as any other information as is necessary and/or desired.

In addition, other payee data, such as expected payment dates, may be provided. Artificial intelligence and/or machine learning may be used to provide recommendations on payors.

The grades, ranks, and/or recommendations may be presented to payees in order for them to select a payor.

Figure 4:
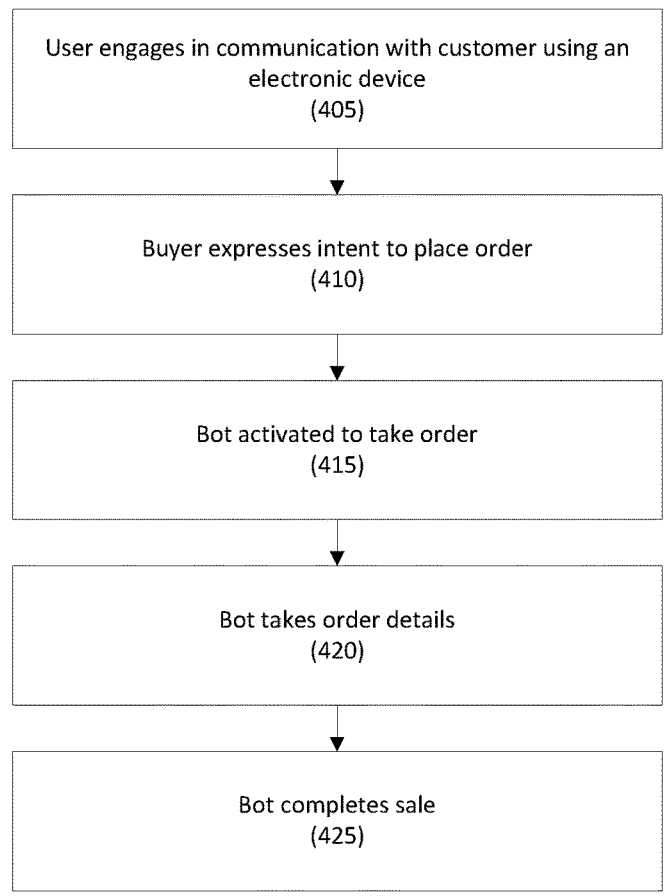
FIG. 4 depicts a method of bot-based interaction according to one embodiment.

Referring to FIG. 4, a method for Bot-assisted transactions is provided according to one embodiment. In step 405, a user, such as a seller, may engage in an electronic communication with another party, such as a buyer. In one embodiment, the roles of the entities may not be established at the time that the communication was initiated; the roles may be determined based on the communication.

In one embodiment, the communication may be a voice-based communication, a text based communication (e.g., SMS/text, chat, instant message, email, etc.), a video conversation, a video conference, an Internet-based meeting, etc. In another embodiment, the communication may be a face-to-face communication.

In step 410, one of the parties (e.g., the buyer) expresses an intention to place an order. In one embodiment, the buyer may use certain terms indicating the desire to place an order, such as "I would like to buy" or "I am ordering." In one embodiment, the seller may also use certain terms indicating that an order is taking place.

In one embodiment, the Bot may be "listening" to electronic communications using an electronic device (e.g., voice, text, etc.). In another embodiment, the Bot may listen to person-to-person communications. For example, the Bot may be executed in a mobile electronic device, in an Internet of Things (IoT) appliance, at a point of sale device, in a computer, etc.

In step 415, the Bot may be activated to take the order. In one embodiment, the Bot may be automatically activated based on recognizing that an order is being placed. Natural language processing may be used to assist the Bot in identifying the intent to place the order.

In another embodiment, the Bot may be activated by the seller. For example, the Bot may be activated by the seller issuing a verbal or text instruction to the Bot, by manually activating the Bot on an electronic device, etc.

In step 420, the Bot may take order details from the buyer. In one embodiment, the seller may participate in the order-taking; in another embodiment, the seller may effectively hand the communication off to the Bot for taking the order.

In one embodiment, the Bot may take all necessary information to complete the transaction, including quantity, buyer information, payment information, etc. In one embodiment, the Bot may upsell additional goods or services.

In step 425, the Bot may complete the sale, and may communicate the sale to fulfillment, a backend system, etc. as necessary. In one embodiment, the Bot may return the call to the seller to continue the conversation.

In one embodiment, although buyer and seller are used to describe the participants, it should be recognized that the buyer may use a Bot to place an order, and the Bot may provide the seller with the necessary information (e.g., buyer information, payment information, etc.). Further, the Bot may assist in person-to-person transactions, where a first person wants to send money to a second person. The Bot may be used to identify accounts for either party and providing the transaction to one of the person's financial institution, to a FinTech, etc. so that the transaction may be completed.

In one embodiment, a Bot can also be in "Always selling" mode, where it listens to all conversations and electronic communications for sales opportunities. The Bot can record and share notes based upon meetings, conversations and identify opportunities for follow up, and may recommend sales opportunities and may initiate orders based upon meetings, conversations and electronic conversations.

In embodiments, a Bot may be provided to upsell goods or services, engage with customers, negotiate, close sales, and provide analytics on sales, performance, and conversion rates. In one embodiment, the upsell may be based on a prior buyer purchase.

A Bot may enable sales engagement and closing at scale. A "Closer Bot" may personally engage, sell and close thousands or millions of potential customers at once. An example scenario involving the use of a Closer Bot is provided in FIG. 5.

Another example scenario involving a Closer Bot is as follows. An events promoter may prepare for a sales campaign by inputting content and details of the campaign, such as name of product or service, description, pictures, video, links, price, time frame, URL links and additional products and services into the Closer Bot dashboard. The promoter may import contacts from the promoter's phone, and may initiate the Closer Bot. Using the Closer Bot, the promoter may set or adjust incentive parameters, such as hot event, celebrity, limited entry, VIP upgrade, overflow party if sold out, after party, and may send the invites.

The customer may receive an invite via text/iOS messenger/Facebook messenger, voice interface, or any form of messaging or communication and may view the content. Interaction by the user, such as expanding the details to reveal info, pricing, etc. may initiate the Closer Bot. An example dialog is provided below:

Closer Bot: This is a hot event and selling fast, we have these celebrities attending.
Customer: Oh wow nice! I want to go.
Closer Bot: How many tickets do you need? You should bring your whole squad.
Customer: Right, good idea, I'll take 5.
Closer Bot: Perfect!
The Closer both then sends a message with a credit card processing modal that captures credit card info through texting numbers/picture of card/Apple Pay/Chase Pay/ tap link to process online, or sends tickets with invoice to pay.

Bot: Done! Here are your 5 tickets! (Bot sends image of tickets or link to download or print tickets).

Bot: For your squad, I would recommend VIP access, you get to sit right next to the celebrities.

Customer: Of course I want VIP! I'll pay. (Bot responds by sending another payment modal).

Bot: Perfect, done again, here's your VIP access. (Bot sends image of upgraded tickets, or password, or code, or link to download or print tickets). Go through the restaurant, downstairs past the bathrooms and through the kitchen you'll see Frantz, show him your VIP access and you're in.

Customer: OMG you're awesome!

Bot: Nah, you're awesome, thank you and enjoy!

Bot: Let me know if you have friends that want to go as well and I'll reach out.

The Bot proceeds to initiate sales with 5 of customer's friends and closes 3 and receives 12 more friends to sell, and keeps going.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

Application Programming Interfaces (APIs) and other software intermediaries that allow two applications to communicate may be used.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. An electronic device, comprising:
   a computer processor; and
   a memory storing a collection bot computer program;
   wherein, when read and executed by the computer processor, the collection bot computer program causes the computer processor to:
   receive invoice information for an invoice for a payor, the invoice information comprising an invoice amount and a due date;
   display, in a chat interface, a payment reminder comprising the invoice amount and the due date to the payor, wherein the chat interface provides real-time two-way messaging with the payor; and
   provide, a payment interface in the chat interface.

2. The electronic device of claim 1, wherein, when read and executed by the computer processor, the collection bot computer program causes the computer processor to:
automatically identify a payment incentive; and
communicate the payment incentive to the payor in the chat interface.

3. The electronic device of claim 2, wherein the payment incentive is a discount on the invoice amount or a discount on a future invoice amount.

4. The electronic device of claim 2, wherein the payment incentive is identified based on a past interaction with the payor.

5. The electronic device of claim 1, wherein, when read and executed by the computer processor, the collection bot computer program causes the computer processor to:
electronically communicate a link to a payment modality to the payor.

6. The electronic device of claim 1, wherein, when read and executed by the computer processor, the collection bot computer program causes the computer processor to:
automatically negotiate with the payor using natural language processing.

7. The electronic device of claim 1, wherein, when read and executed by the computer processor, the collection bot computer program causes the computer processor to:
update a payor record with a result of the payment reminder.

8. An electronic device, comprising:
a computer processor; and
a memory storing a collection bot computer program;
wherein, when read and executed by the computer processor, the collection bot computer program causes the computer processor to:
monitor a real-time messaging interaction between a buyer and a seller;
in response to sensing an order in the real-time messaging interaction, prompt, in a two-way chat interface, the buyer or the seller for order details for an order being placed by a buyer, wherein the order details comprise an identification of a good or service, a quantity, a price, and a payment method;
receive the order details in the two-way chat interface; and
communicate the order details to a backend system for fulfillment.

9. The electronic device of claim 8, wherein the real-time messaging interaction is an electronic text-based communication.

10. The electronic device of claim 8, wherein the real-time messaging interaction is a voice communication over an electronic device.

11. The electronic device of claim 8, wherein, when read and executed by the computer processor, the collection bot computer program causes the computer processor to:
automatically identify an upsell to present to the buyer; and
present the upsell to the buyer in the two-way chat interface.

12. The electronic device of claim 11, wherein the upsell is based on a buyer interest.

13. The electronic device of claim 11, wherein the upsell is based on a successful upsell with a prior buyer of the good or service.

14. A method for Bot-based selling, comprising:
monitoring, by a Bot executed by at least one computer processor, a real-time messaging interaction between a first buyer and a seller, wherein the Bot comprises a computer program that is programmed to monitor the real-time messaging interaction;
in response to sensing an order for an item from the first buyer in the real-time messaging interaction, electronically prompting, by the Bot in first two-way chat interface, the first buyer for contact information for a second buyer;
receiving, by the Bot, the contact information for the second buyer in the first two-way chat interface;
contacting, by the Bot, the second buyer in a second two-way chat interface; and
presenting, by the Bot, an offer for the item to the second buyer in the second two-way chat interface.

15. The method of claim 14, further comprising:
sending, by the Bot, a first payment interface for the item to the first buyer in response to sensing the order from the first buyer.

16. The method of claim 15, wherein the first payment interface is sent in the first two-way chat interface.

17. The method of claim 14, further comprising:
sending, by the Bot, a second payment interface for the item to the second.

18. The method of claim 17, wherein the second payment interface is sent in the second two-way chat interface.

19. The method of claim 14, wherein the item comprises a ticket to an event.

20. The method of claim 14, wherein the contact information for the second buyer is imported from a contacts application on an electronic device executing the first two-way chat interface.

* * * * *